(12) United States Patent
Kang et al.

(10) Patent No.: US 12,390,761 B2
(45) Date of Patent: Aug. 19, 2025

(54) TARGET GAS SEPARATION METHOD USING DEEP COOLING PROCESS

(71) Applicant: BENIT M CO., LTD., Ulsan (KR)

(72) Inventors: Ki Joon Kang, Ulsan (KR); Rionugroho Harvianto Gregorius, Ulsan (KR); Kwang Hyun Kim, Ulsan (KR)

(73) Assignee: BENIT M CO., LTD., Ulsan (KR)

( * ) Notice: Subject to any disclaimer, the term of this patent is extended or adjusted under 35 U.S.C. 154(b) by 283 days.

(21) Appl. No.: 18/348,685

(22) Filed: Jul. 7, 2023

(65) Prior Publication Data

US 2024/0017207 A1    Jan. 18, 2024

(30) Foreign Application Priority Data

Jul. 12, 2022   (KR) .......................... 10-2022-0085876

(51) Int. Cl.
*B01D 53/00* (2006.01)
*B01D 53/26* (2006.01)

(52) U.S. Cl.
CPC ........ *B01D 53/265* (2013.01); *B01D 2256/22* (2013.01); *B01D 2257/80* (2013.01)

(58) Field of Classification Search
CPC ............ B01D 2256/22; B01D 2257/80; B01D 53/265
See application file for complete search history.

(56) References Cited

U.S. PATENT DOCUMENTS

| | | | | |
|---|---|---|---|---|
| 4,928,498 | A * | 5/1990 | Gossler | F25D 21/12 62/81 |
| 9,950,291 | B1 * | 4/2018 | Wright | B01D 53/0423 |
| 10,753,679 | B2 * | 8/2020 | Zanganeh | F25J 3/067 |
| 11,285,438 | B2 * | 3/2022 | Nishibe | B01D 53/265 |
| 2010/0028233 | A1 * | 2/2010 | Dreuscher | B01D 53/501 423/244.08 |
| 2014/0331864 | A1 * | 11/2014 | Ogino | B01D 53/08 96/145 |
| 2020/0306687 | A1 * | 10/2020 | Boulet | B01D 53/0462 |
| 2022/0203293 | A1 * | 6/2022 | Myrick | B01D 53/226 |

* cited by examiner

*Primary Examiner* — Filip Zec
(74) *Attorney, Agent, or Firm* — Perman & Green, LLP (57) ABSTRACT

A target gas separation method using a deep cooling process includes a first process operation including a first thawing operation of blocking the first gas inlet unit and introducing inlet gas to the second heat exchanger through the second gas inlet unit to thaw the second heat exchanger and a first freezing operation transferring gas flowing into the second heat exchanger to the first heat exchanger through the second connection pipe to freeze target gas in the first heat exchanger, and a second process operation including a second thawing operation of blocking the second gas inlet unit and introducing inlet gas to the first heat exchanger through the first gas inlet unit to thaw the first heat exchanger and a second freezing operation of transferring gas flowing into the first heat exchanger to the second heat exchanger through the first connection pipe to freeze the target gas in the second heat exchanger, and wherein, after the first process operation is performed for a designated time, the second process operation is performed for another designated time.

9 Claims, 4 Drawing Sheets

TARGET GAS SEPARATION METHOD USING DEEP COOLING PROCESS

CROSS-REFERENCE TO RELATED APPLICATION

This application is based on and claims priority under 35 U.S.C. § 119 to Korean Patent Application No. 10-2022-0085876, filed on 12 Jul. 2022, in the Korean Intellectual Property Office, the disclosure of which is incorporated by reference herein in its entirety.

BACKGROUND

1. Field

The disclosure relates to a target gas separation method using a deep cooling process, and more particularly, to a target gas separation method using a deep cooling process, which separates moisture gas from natural gas, flue gas, and synthetic gas while repeatedly freezing and thawing a heat exchanger in the deep cooling process.

2. Description of the Related Art

Carbon dioxide is included in natural gas, flue gas, and synthetic gas, and technology to capture carbon dioxide with high purity from natural gas, flue gas, and synthetic gas has been developed.

Depending on transportation or use, carbon dioxide with high purity needs to remove moisture at a concentration of 20 ppm mol or less or 500 ppm mol or less, and carbon dioxide with high purity of 95% mol or more or 99.5% mol or more is required.

In particular, when moisture is mixed with carbon dioxide, the moisture may be frozen at a low temperature or $CO_2$ hydrate is generated to cause clogging of pipes or equipment, and thus moisture removal is essential in a process of capturing carbon dioxide.

A method of removing moisture from an inlet gas includes a method of removing moisture by passing the inlet gas through a moisture adsorption tower filled with moisture adsorbent. However, when moisture is removed through the above method, several stages of adsorption towers must be used to remove moisture to tens of ppm or less.

In addition, to regenerate the adsorbent adsorbed with moisture, a dry gas must be heated and re-introduced into the moisture adsorption tower, so there is a loss of dry gas or an increase in the circulation amount of devices, and the adsorbent needs to be replaced after use for a certain period.

Another method of removing moisture from an inlet gas includes a method of condensing and removing moisture in a heat exchanger. In this method, a temperature in the heat exchanger must be set to 0 degrees or more to prevent moisture from freezing.

However, it is difficult to remove moisture to tens of ppm or less through the method of cooling moisture to 0 degrees or more. To remove moisture to tens of ppm or less, the heat exchanger must be cooled to 0 degrees or less, but when the heat exchanger is cooled to 0 degrees or less, moisture is frozen on a heat exchange surface of the heat exchanger.

To thaw the frozen moisture, an inlet gas must be blocked, hot water must be introduced into a space where a refrigerant is introduced and then the refrigerant is supplied again after thawing is completed, and thus the refrigerant easily is lost or contaminated. Also, the temperature of the space in which moisture is frozen inside the heat exchanger does not rise easily, and thus thawing requires a lot of time.

SUMMARY

Provided is a target gas separation method using a deep cooling process, which separates moisture gas from natural gas, flue gas, and synthetic gas while repeatedly freezing and thawing a heat exchanger in the deep cooling process.

Additional aspects will be set forth in part in the description which follows and, in part, will be apparent from the description, or may be learned by practice of the presented embodiments of the disclosure.

According to an aspect of the disclosure, a target gas separation method using a deep cooling process is a method of separating gas through a gas separation device configured to separate gas by using a deep cooling process, wherein the gas separation device includes a first heat exchanger configured to cool inlet gas, a first gas inlet unit connected to the first heat exchanger and configured to introduce the inlet gas into the first heat exchanger, a second heat exchanger configured to cool inlet gas, a second gas inlet unit connected to the second heat exchanger and configured to introduce the inlet gas to the second heat exchanger, a first connection pipe configured to transfer gas from the first heat exchanger to the second heat exchanger, and a second connection pipe configured to transfer gas from the second heat exchanger to the first heat exchanger, the target gas separation method including a first process operation including a first thawing operation of blocking the first gas inlet unit and introducing inlet gas to the second heat exchanger through the second gas inlet unit to thaw the second heat exchanger and a first freezing operation transferring gas flowing into the second heat exchanger to the first heat exchanger through the second connection pipe to freeze target gas in the first heat exchanger, and a second process operation including a second thawing operation of blocking the second gas inlet unit and introducing inlet gas to the first heat exchanger through the first gas inlet unit to thaw the first heat exchanger and a second freezing operation of transferring gas flowing into the first heat exchanger to the second heat exchanger through the first connection pipe to freeze the target gas in the second heat exchanger, and wherein, after the first process operation is performed for a designated time, the second process operation is performed for another designated time.

In the target gas separation method using a deep cooling process, the first process operation and the second process operation may be alternately performed.

In the target gas separation method using a deep cooling process, the target gas may include moisture.

In the target gas separation method using a deep cooling process, the first gas inlet unit and the second gas inlet unit may be connected to a compressor.

In the target gas separation method using a deep cooling process, the first gas inlet unit may include a first opening/closing valve configured to open and close the first gas inlet unit, and the second gas inlet unit may include a second opening/closing valve configured to open and close the second gas inlet unit.

In the target gas separation method using a deep cooling process, the first connection pipe may include a first connection valve configured to open and close the first connection pipe, and the second connection pipe may include a second connection valve configured to open and close the second connection pipe.

In the target gas separation method using a deep cooling process, the first connection pipe and the second connection pipe may be connected to a connection compressor.

In the target gas separation method using a deep cooling process, the first connection pipe may include a first compressor connection valve configured to open and close the first connection pipe at a front end of the first connection compressor, and the second connection pipe may include a second compressor connection valve configured to open and close the second connection pipe at the front end of the connection compressor.

In the target gas separation method using a deep cooling process, the gas separation device may further include a first branch pipe connected to the second heat exchanger and branched from the first connection pipe, and a second branch pipe connected to the first heat exchanger and branched from the second connection pipe, wherein the first branch pipe may include a first branch pipe valve configured to open and close the first branch pipe, and the second branch pipe may include a second branch pipe valve configured to open and close the second branch pipe.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure will be described more fully with reference to embodiments. The disclosure may, however, be embodied in many different forms and should not be construed as being limited to the exemplary embodiments set forth herein. Rather, these embodiments are provided so that this disclosure will be thorough and complete, and will fully convey the scope of the inventive concept to one of ordinary skill in the art.

Expressions such as "include" or "may include" that may be used in various embodiments of the disclosure indicate the existence of a function, operation, or component that has been disclosed, and does not limit one or more additional functions, operations, or components. Also, in various embodiments of the disclosure, terms such as "include" or "have" are intended to designate the existence of features, numbers, steps, operations, components, parts, or combinations thereof described in the disclosure, and it should be understood that the presence or addition of one or more other features, numbers, steps, operations, components, parts, or combinations thereof is not precluded.

When a component is referred to as being "connected or coupled" to another component, the component may be directly connected or coupled to the other component, but it should be understood that another new component may exist between the certain component and the other component. On the contrary, when a component is referred to as being "directly connected" or "directly couple" to another component, it should be understood that no new component exists between the component and the other component.

It will be understood that although the terms "first," "second," etc. may be used herein to describe various components, these components should not be limited by these terms. These components are only used to distinguish one component from another.

The disclosure relates to a target gas separation method using a deep cooling process, and more particularly, to a target gas separation method using a deep cooling process, which separates moisture gas from natural gas, flue gas, and synthetic gas while repeatedly freezing and thawing a heat exchanger in the deep cooling process.

To separate carbon dioxide ($CO_2$) with high purity from natural gas, flue gas, and synthetic gas, moisture must be separated before separating carbon dioxide.

In the target gas separation method using a deep cooling process according to an embodiment, the target gas may be moisture, and the target gas separation method using a deep cooling process according to an embodiment may be a method of separating moisture before separating carbon dioxide ($CO_2$) from natural gas, flue gas, or synthetic gas.

The target gas of the target gas method using a deep cooling process according to an embodiment may be moisture gas, but is not necessarily limited thereto. The target gas separation method using a deep cooling process according to an embodiment may also be applied to a method of separating gas that is not moisture but has properties similar to moisture. Hereinafter, the disclosure will now be described more fully with reference to the accompanying drawings, in which embodiments of the inventive concept are shown.

Figure 1:
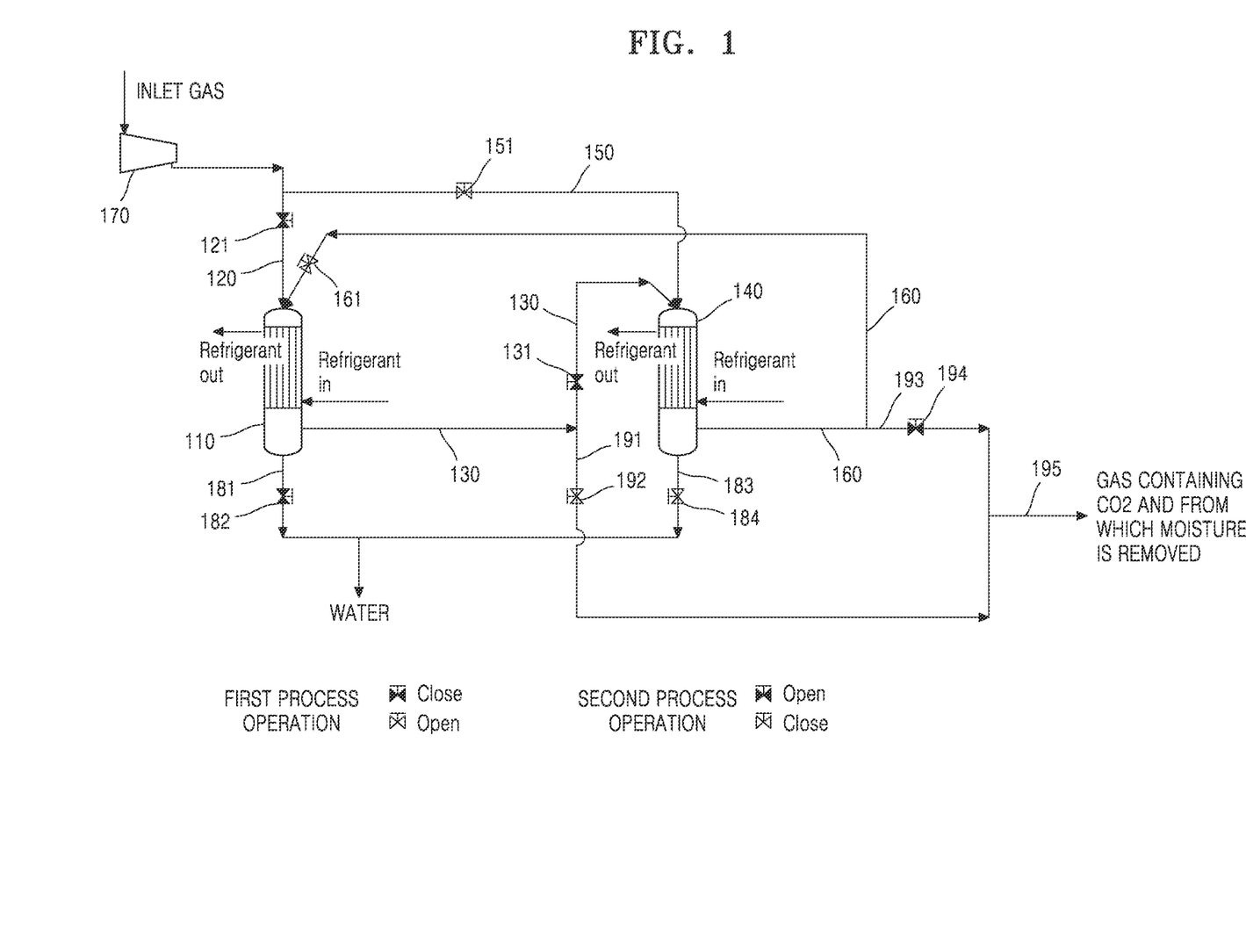
FIG. 1 is a diagram illustrating a gas separation device according to an embodiment.
Figure 2:
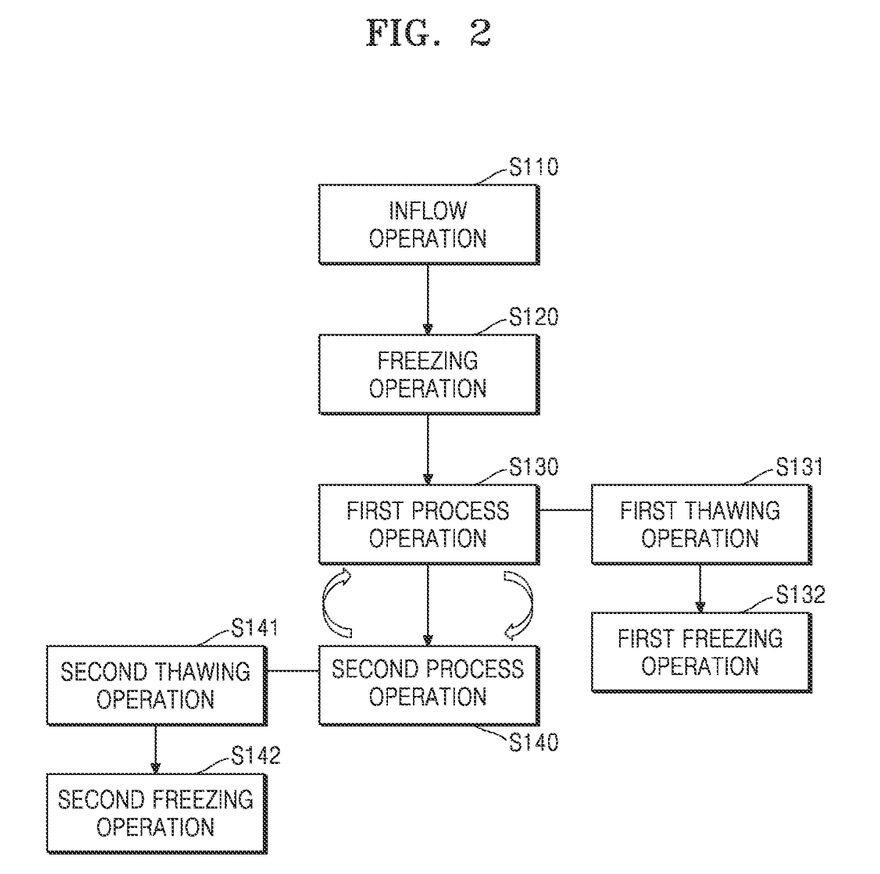
FIG. 2 is a process chart of a target gas separation method using a deep cooling process, according to an embodiment.

Referring to FIGS. 1 and 2, the gas separation method using a deep cooling process according to an embodiment includes inflow operation S110, freezing operation S120, first process operation S130, and second process operation S140.

The gas separation method using a deep cooling process according to an embodiment is a method of separating gas through a gas separation device configured to separate a target gas by using a deep cooling process, and the gas separation device includes a first heat exchanger 110, a first gas inlet unit 120, a first connection pipe 130, a second heat exchanger 140, a second gas inlet unit 150, and a second connection pipe 160.

The first heat exchanger 110 cools inlet gas, and a refrigerant may flow into the first heat exchanger 110. The first heat exchanger 110 may cool inlet gas through the refrigerant.

The first gas inlet unit 120 may introduce inlet gas into the first heat exchanger 110 while being connected to the first heat exchanger 110. The first gas inlet unit 120 is a pipe connected to the first heat exchanger 110, and inlet gas may flow into the first heat exchanger 110 through the first gas inlet unit 120.

The first gas inlet unit 120 may include a first opening/closing valve 121 that opens and closes the first gas inlet unit 120. The first gas inlet unit 120 may be opened or closed through the first opening/closing valve 121.

The first connection pipe 130 transfers gas from the first heat exchanger 110 to the second heat exchanger 140. The first connection pipe 130 may be a pipe that may transfer gas discharged from the first heat exchanger 110 to the second heat exchanger 140, and the first heat exchanger 110 and the second heat exchanger 140 may be connected to each other through the first connection pipe 130.

The first connection pipe 130 may include a first connection valve 131 that opens and closes the first connection pipe 130. The first connection pipe 130 may be opened and closed through the first connection valve 131, and the flow of gas from the first heat exchanger 110 to the second heat exchanger 140 may be adjusted through the first connection valve 131.

The gas separation device may further include a first gas discharge pipe 191 and a first liquid discharge pipe 181. The first gas discharge pipe 191 is a pipe branched from the first connection pipe 130 and discharges gas from the first heat exchanger 110 to the outside.

The first gas discharge pipe 191 may include a first gas discharge valve 192 that opens and closes the first gas discharge pipe 191. The first gas discharge pipe 191 may be opened and closed through the first gas discharge valve 192, and accordingly, the discharge of gas from the first heat exchanger 110 to the outside may be adjusted.

In particular, when the first connection valve 131 of the first connection pipe 130 is opened and the first gas discharge valve 192 is closed, gas from the first heat exchanger 110 may flow into the second heat exchanger 140 through the first connection pipe 130.

On the contrary, when the first connection valve 131 of the first connection pipe 130 is closed and the first gas discharge valve 192 is opened, gas from the first heat exchanger 110 may be discharged to the outside.

The first liquid discharge pipe 181 may discharge liquid generated in the first heat exchanger 110 to the outside. The first liquid discharge pipe 181 may include a first liquid discharge valve 182 that opens and closes the first liquid discharge pipe 181. The first liquid discharge pipe 181 may be opened and closed through the first liquid discharge valve 182, and accordingly, the discharge of liquid from the first heat exchanger 110 to the outside may be adjusted.

The second heat exchanger 140 cools inlet gas, and a refrigerant may flow into the second heat exchanger 140. The second heat exchanger 140 may cool inlet gas through the refrigerant.

The second gas inlet unit 150 may introduce inlet gas into the second heat exchanger 140 while being connected to the second heat exchanger 140. The second gas inlet unit 150 is a pipe connected to the second heat exchanger 140, and inlet gas may flow into the second heat exchanger 140 through the second gas inlet unit 150.

The second gas inlet unit 150 may include a second opening/closing valve 151 that opens and closes the second gas inlet unit 150. The second gas inlet unit 150 may be opened or closed through the second opening/closing valve 151.

The second connection pipe 160 transfers gas from the second heat exchanger 140 to the first heat exchanger 110. The second connection pipe 160 may be a pipe that may transfer gas discharged from the second heat exchanger 140 to the first heat exchanger 110, and the second heat exchanger 140 and the first heat exchanger 110 may be connected to each other through the second connection pipe 160.

The second connection pipe 160 may include a second connection valve 161 that opens and closes the second connection pipe 160. The second connection pipe 160 may be opened and closed through the second connection valve 161, and the flow of gas from the second heat exchanger 140 to the first heat exchanger 110 may be adjusted through the second connection valve 161.

The gas separation device may further include a second gas discharge pipe 193 and a second liquid discharge pipe 183. The second gas discharge pipe 193 is a pipe branched from the second connection pipe 160 and discharges gas from the second heat exchanger 140 to the outside.

The second gas discharge pipe 193 may include a second gas discharge valve 194 that opens and closes the second gas discharge pipe 193. The second gas discharge pipe 193 may be opened and closed through the second gas discharge valve 194, and accordingly, the discharge of gas from the second heat exchanger 140 to the outside may be adjusted.

In particular, when the second connection valve 161 of the second connection pipe 160 is opened and the second gas discharge valve 194 is closed, gas from the second heat exchanger 140 may flow into the first heat exchanger 110 through the second connection pipe 160.

On the contrary, when the second connection valve 161 of the second connection pipe 160 is closed and the second gas discharge valve 194 is opened, gas from the second heat exchanger 140 may be discharged to the outside.

The second liquid discharge pipe 183 may discharge liquid generated in the second heat exchanger 140 to the outside. The second liquid discharge pipe 183 may include a second liquid discharge valve 184 that opens and closes the second liquid discharge pipe 183. The second liquid discharge pipe 183 may be opened and closed through the second liquid discharge valve 184, and accordingly, the discharge of liquid from the second heat exchanger 140 to the outside may be adjusted.

The first gas inlet unit 120 and the second gas inlet unit 150 of the gas separation device may also be connected to a compressor 170. However, the compressor 170 may or may not be used as needed.

Figure 3:
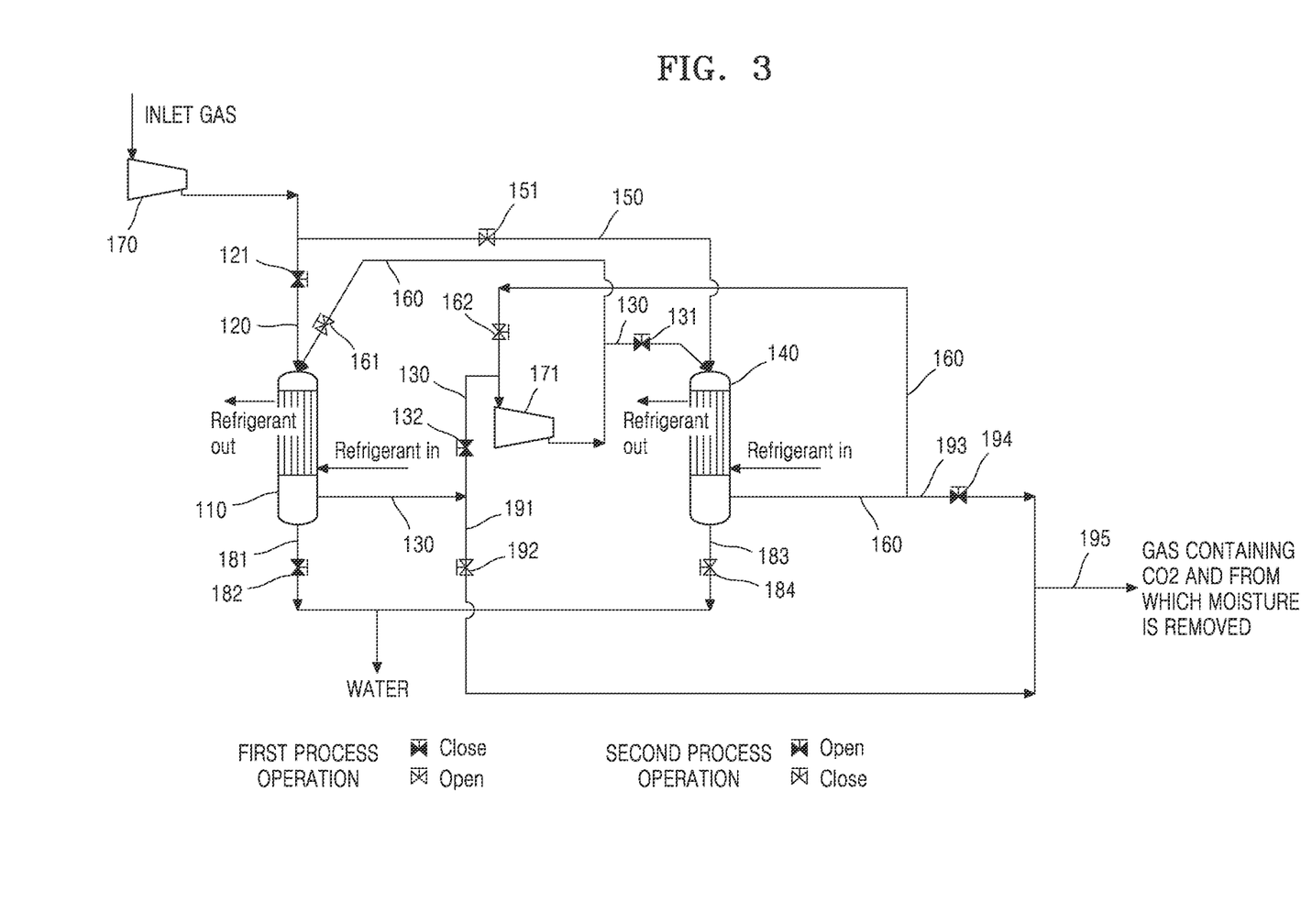
FIG. 3 is a diagram of a target gas separation device in which a connection compressor is connected to a first connection pipe and a second connection pipe, according to an embodiment.

Referring to FIG. 3, the first connection pipe 130 and the second connection pipe 160 of the gas separation device may be connected to a connection compressor 171. At this time, the first connection pipe 130 and the second connection pipe 160 may be connected to one connection compressor 171.

The first connection pipe 130 and the second connection pipe 160 may share one connection compressor 171, and the first connection pipe 130 and the second connection pipe 160 may be connected to each other through one connection compressor 171.

Referring to FIG. 3, the first connection pipe 130 may include a first compressor connection valve 132 opening and closing the first connection pipe 130 at a front end of the connection compressor 171. The first connection pipe 130 may be opened and closed at the front end of the connection compressor 171 through the first compressor connection valve 132, and accordingly, supply of gas to the connection compressor 171 may be adjusted.

The second connection pipe 160 may include a second compressor connection valve 162 opening and closing the second connection pipe 160 at the front end of the connection compressor 171. The second connection pipe 160 may be opened and closed at the front end of the connection compressor 171 through the second compressor connection valve 162, and accordingly, the supply of gas to the connection compressor 171 may be adjusted.

Figure 4:
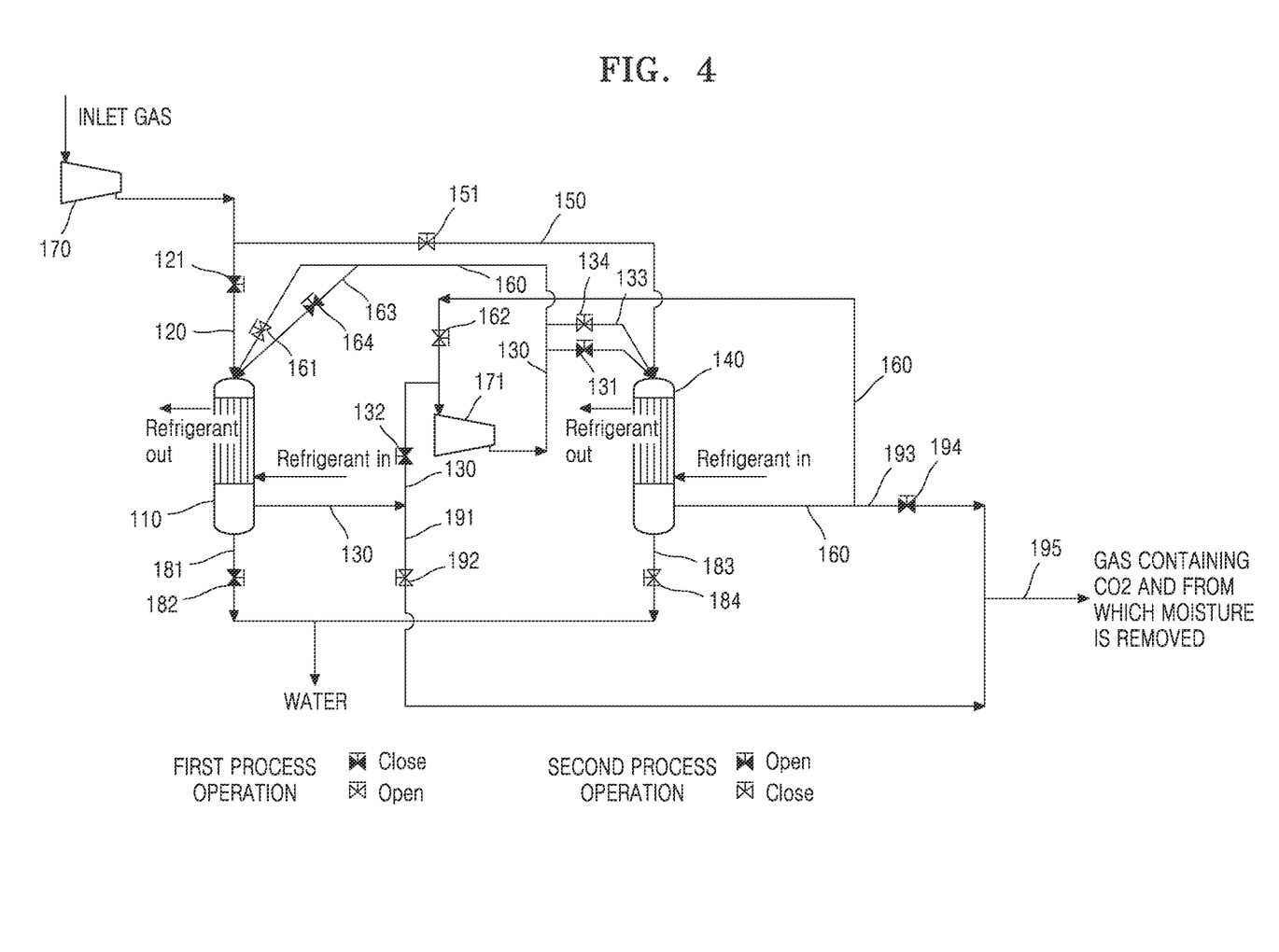
FIG. 4 is a diagram of a gas separation device which further includes a second branch pipe branched from the second connection pipe and a first branch pipe branched from the first connection pipe, according to another embodiment.

Referring to FIG. 4, the gas separation device further includes a first branch pipe 133 branched from the first connection pipe 130 and connected to the second heat exchanger 140, and a second branch pipe 163 branched from the second connection pipe 160 and connected to the first heat exchanger 110.

The first branch pipe 133 may include a first branch pipe valve 134 that opens and closes the first branch pipe 133, and the second branch pipe 163 may include a second branch pipe valve 164 that opens and closes the second branch pipe 163.

The second branch pipe 163 may re-introduce gas discharged from the first heat exchanger 110 to the first heat exchanger 110 again. In particular, gas discharged from the first heat exchanger 110 may flow into the connection compressor 171 through the first connection pipe 130. At this time, the first compressor connection valve 132 is open, and the second compressor connection valve 162 is closed.

The connection compressor 171 is connected to the first connection pipe 130 and the second connection pipe 160, and gas flowing into the connection compressor 171 may move along the first connection pipe 130 and the second connection pipe 160.

Referring to FIG. 4, gas moving through the first connection pipe 130 flows into the second heat exchanger 140. At this time, the first branch pipe valve 134 is closed, and the first connection valve 131 is open. Gas moving along the second connection pipe 160 may flow into the first heat exchanger 110 by moving along the second branch pipe 163. At this time, the second branch pipe valve 164 is open, and the second connection valve 161 is closed.

As such, gas discharged from the first heat exchanger 110 may reflow into the first heat exchanger 110 through the first connection pipe 130—the connection compressor 171—the second connection pipe 160—the second branch pipe 163.

The first branch pipe 133 may re-introduce gas discharged from the second heat exchanger 140 to the second heat exchanger 140 again. In particular, gas discharged from the second heat exchanger 140 may flow into the connection compressor 171 through the second connection pipe 160. At this time, the second compressor connection valve 162 is open, and the first compressor connection valve 132 is closed.

The connection compressor 171 is connected to the first connection pipe 130 and the second connection pipe 160, and gas flowing into the connection compressor 171 may move along the second connection pipe 160 and the first connection pipe 130.

Referring to FIG. 4, gas moving through the second connection pipe 160 flows into the first heat exchanger 110. At this time, the second branch pipe valve 164 is closed, and the second connection valve 161 is open. Gas moving along the first connection pipe 130 may flow into the second heat exchanger 140 by moving along the first branch pipe 133. At this time, the first branch pipe valve 134 is open, and the first connection valve 131 is closed.

As such, gas discharged from the second heat exchanger 140 may reflow into the second heat exchanger 140 through the second connection pipe 160—the connection compressor 171—the first connection pipe 130—the first branch pipe 133.

Hereinafter, a target gas separation method using a deep cooling process according to an embodiment using the gas separation device described above is described in detail.

FIGS. 1, 3, and 4 are diagrams showing a method of separating moisture from inlet gas through the target gas separation method using a deep cooling process according to an embodiment. In the target gas separation method using a deep cooling process according to an embodiment, the target gas to be separated may be moisture. However, the disclosure is not limited thereto, and in the target gas separation method using a deep cooling process according to an embodiment, the target gas to be separated may be gas having properties similar to moisture.

Hereinafter, as shown in FIGS. 1, 3, and 4, a method of using moisture as target gas and separating moisture from inlet gas is mainly described.

Inlet gas flowing into the gas separation device is gas in which moisture, such as nitrogen, oxygen, carbon monoxide, hydrogen, hydrocarbon, nitrogen oxide, sulfur oxide, carbonyl sulfide (COS), hydrogen sulfide ($H_2S$), carbon disulfide ($CS_2$), or the like, is mixed with carbon dioxide.

To separate carbon dioxide ($CO_2$) with high purity from natural gas, flue gas, and synthetic gas, moisture must be separated before separating carbon dioxide. The target gas separation method using a deep cooling process according to an embodiment may be a method of separating moisture before separating carbon dioxide ($CO_2$) from natural gas, flue gas, and synthetic gas.

Inlet gas flowing into the gas separation device may flow into any one of the first gas inlet unit 120 and the second gas inlet unit 150. In particular, when the first opening/closing valve 121 of the first gas inlet unit 120 is open and the second opening/closing valve 151 of the second gas inlet unit 150 is closed, the inlet gas may flow into the first gas inlet unit 120.

On the contrary, when the first opening/closing valve 121 of the first gas inlet unit 120 is closed and the second opening/closing valve 151 of the second gas inlet unit 150 is open, the inlet gas may flow into the second gas inlet unit 150.

Referring to FIG. 2, inflow operation S110 of the target gas separation method using a deep cooling process according to an embodiment is an operation of introducing inlet gas to the first heat exchanger 110 through the first gas inlet unit 120.

By opening the first opening/closing valve 121 of the first gas inlet unit 120 and closing the second opening/closing valve 151 of the second gas inlet unit 150, the inlet gas is introduced into the first gas inlet unit 120. At this time, the compressor 170 may or may not be connected to the first gas inlet unit 120 and the second gas inlet unit 150.

In the first heat exchanger 110, target gas may be primarily removed, and gas from which target gas is primarily removed in the first heat exchanger 110 is transferred to the second heat exchanger 140 by moving along the first connection pipe 130.

In particular, moisture, which is the target gas, may be primarily removed in the first heat exchanger 110, and gas from which moisture is primarily removed in the first heat exchanger 110 is transferred to the second heat exchanger 140 by moving along the first connection pipe 130.

A refrigerant may be supplied to the first heat exchanger 110, and target gas among gases flowing into the first heat exchanger 110 is condensed through the refrigerant. Here, in the first heat exchanger 110, freezing does not occur, and only condensation of the target gas may occur.

That is, only condensation instead of freezing occurs in the first heat exchanger 110 by adjusting refrigerant supplied to the first heat exchanger 110. According to an embodiment, when target gas is moisture, the temperature of gas discharged from the first heat exchanger 110, from which moisture is removed, may be equal to or greater than 0 degrees by adjusting the temperature or flow rate of refrigerant supplied to the first heat exchanger 110.

Also, the temperature or flow rate of the refrigerant supplied to the first heat exchanger 110 may be adjusted so that the temperature of gas discharged from the first heat exchanger 110 through the first connection pipe 130 is less than the temperature of inlet gas.

Freezing operation S120 is an operation of transferring inlet gas flowing into the first heat exchanger 110 to the second heat exchanger 140 through the first connection pipe 130 to freeze the target gas in the second heat exchanger 140.

The target gas may be primarily removed in the first heat exchanger 110, and the gas from which the target gas is primarily removed may be transferred to the second heat exchanger 140 through the first connection pipe 130. The target gas may be removed once more by freezing the target gas in the second heat exchanger 140, and gas from which the target gas is removed may be discharged through the second gas discharge pipe 193.

In particular, moisture, which is the target gas, may be primarily removed in the first heat exchanger 110, and gas from which moisture is primarily removed in the first heat exchanger 110 is transferred to the second heat exchanger 140 by moving along the first connection pipe 130. When gas from which moisture is primarily removed is transferred from the first heat exchanger 110 by moving along the first connection pipe 130, the first connection valve 131 may be opened, and the first gas discharge valve 192 may be closed.

Moisture may be removed once more by freezing the moisture in the second heat exchanger 140, and gas from which moisture is removed may be discharged through the second gas discharge pipe 193.

A refrigerant may be supplied to the second heat exchanger 140, and target gas among gases flowing into the second heat exchanger 140 is frozen by the refrigerant. According to an embodiment, when the target gas is moisture, moisture is frozen in the second heat exchanger 140 by adjusting refrigerant supplied to the second heat exchanger 140. At this time, the temperature of gas discharged from the second heat exchanger 140, from which moisture is removed, may be lower than 0 degrees, which is a temperature at which moisture may be frozen.

After inflow operation S110 and freezing operation S120, first process operation S130 may be performed. Here, inflow operation S110 and freezing operation S120 are operations in which freezing occurs before first process operation S140 and second process operation S150. When freezing has already occurred in the second heat exchanger 140, inflow operation S110 and freezing operation S120 may be omitted, and first process operation S140 and second process operation S150 may be performed.

Referring to FIG. first process operation S130 include first thawing operation S131 and first freezing operation S132.

First thawing operation S131 is an operation in which the first gas inlet unit 120 is blocked and inlet gas is introduced into the second heat exchanger 140 through the second gas inlet unit 150 to thaw the second heat exchanger 140.

Referring to FIG. 1, by closing the first opening/closing valve 121 of the first gas inlet unit 120 and opening the second opening/closing valve 151 of the second gas inlet unit 150, the inlet gas is introduced into the second gas inlet unit 150. At this time, the compressor 170 may or may not be connected to the first gas inlet unit 120 and the second gas inlet unit 150.

The second heat exchanger 140 is in a state in which freezing has occurred, and inlet gas flowing into the second heat exchanger 140 may have a temperature greater than a freezing temperature of the target gas. As the inlet gas is introduced into the second heat exchanger 140, the second heat exchanger 140 may be thawed. At this time, in the second heat exchanger 140, condensation of the target gas also occurs, so that the target gas may be primarily removed from the inlet gas.

A refrigerant may be supplied to the second heat exchanger 140, and target gas among gases flowing into the second heat exchanger 140 is condensed through the refrigerant. Here, in the second heat exchanger 140, freezing does not occur, and only condensation of the target gas may occur. That is, the target gas may be condensed from the inlet gas while the second heat exchanger 140 is thawed by adjusting the temperature or flow rate of refrigerant supplied to the second heat exchanger 140.

Because a temperature at which the target gas is condensed is greater than a freezing temperature, thawing may occur in the second heat exchanger 140. In particular, the second heat exchanger 140 is thawed while using the inlet gas flowing into the second heat exchanger 140 as a sweep gas, and at the same time, the target gas may be condensed from the inlet gas.

Gas from which the target gas is primarily removed in the second heat exchanger 140 is transferred to the first heat exchanger 110 by moving along the second connection pipe 160. When the gas from which moisture is primarily removed is transferred from the second heat exchanger 140 by moving along the second connection pipe 160, the second connection valve 161 may be opened, and the second gas discharge valve 194 may be closed.

According to an embodiment, when the target gas is moisture, moisture frozen in the second heat exchanger 140 may be thawed by inlet gas flowing into the second heat exchanger 140, and the moisture may be primarily removed while being condensed from the inlet gas flowing into the second heat exchanger 140.

The moisture thawed in the second heat exchanger 140 and the moisture condensed in the second heat exchanger 140 may be discharged through the second liquid discharge pipe 183, and at this time, the second liquid discharge valve 184 may be opened. Gas from which moisture is primarily removed in the second heat exchanger 140 is transferred to the first heat exchanger 110 by moving along the second connection pipe 160.

Here, the temperature of gas discharged from the second heat exchanger 140, from which moisture is primarily removed, may be greater than 0 degrees by adjusting refrigerant supplied to the second heat exchanger 140. Because moisture must be condensed in the second heat exchanger 140 while thawing occurs, the temperature of gas discharged from the second heat exchanger 140, from which moisture is primarily removed, must be greater than 0 degrees.

Also, the temperature or flow rate of the refrigerant supplied to the second heat exchanger 140 may be adjusted so that the temperature of gas discharged from the second heat exchanger 140 through the second connection pipe 160 is less than the temperature of inlet gas.

When the temperature of gas discharged from the second heat exchanger 140 through the second connection pipe 160 is greater than the temperature of the inlet gas, the target gas included in the inlet gas may be discharged without being condensed. Also, while the target gas thawed in the second heat exchanger 140 is vaporized, the concentration of the target gas among gases discharged from the second heat exchanger 140 through the second connection pipe 160 may be greater than the concentration of the target gas among the inlet gas.

Accordingly, the temperature or flow rate of refrigerant supplied to the second heat exchanger 140 is preferably adjusted so that the temperature of gas discharged from the second heat exchanger 140 through the second connection pipe 160 is less than the temperature of inlet gas.

First freezing operation S132 is an operation of transferring inlet gas flowing into the second heat exchanger 140 to the first heat exchanger 110 through the second connection pipe 160 to freeze the target gas in the first heat exchanger 110.

In the first heat exchanger 110, the target gas may be removed once more through freezing. Gas from which the target gas is removed once more through freezing in the first heat exchanger 110 may be discharged through the first gas discharge pipe 191. At this time, the first gas discharge valve 192 is open.

In particular, moisture may be removed once more by freezing the moisture in the first heat exchanger 110, and gas from which moisture is removed may be discharged through the first gas discharge pipe 191. At this time, the first gas discharge valve 192 is open.

The first gas discharge pipe 191 is connected to a gas discharge pipe 195 discharging gas to the outside, and gas containing carbon dioxide while from which moisture is removed may be discharged through the gas discharge pipe 195.

A refrigerant may be supplied to the first heat exchanger 110, and the target gas among gases flowing into the first heat exchanger 110 may be frozen. According to an embodiment, when the target gas is moisture, moisture is frozen in the first heat exchanger 110 by adjusting refrigerant supplied to the first heat exchanger 110. At this time, the temperature of gas discharged from the first heat exchanger 110, form which moisture is removed, may be lower than 0 degrees, which is a temperature at which moisture may be frozen.

In first process operation S130, first thawing operation S131 may occur in the second heat exchanger 140, and first freezing operation S132 may occur in the first heat exchanger 110.

According to an embodiment, first thawing operation S131 and first freezing operation S132 of first process operation S130 may be simultaneously performed. That is, thawing may occur in the second heat exchanger 140, and freezing may occur in the first heat exchanger 110.

Referring to FIG. 2, second process operation S140 includes second thawing operation S141 and second freezing operation S142.

Second thawing operation S141 is an operation in which the second gas inlet unit 150 is blocked and inlet gas is introduced into the first heat exchanger 110 through the first gas inlet unit 120 to thaw the first heat exchanger 110.

Referring to FIG. 1, by opening the first opening/closing valve 121 of the first gas inlet unit 120 and closing the second opening/closing valve 151 of the second gas inlet unit 150, the inlet gas is introduced into the first gas inlet unit 120. At this time, the compressor 170 may or may not be connected to the first gas inlet unit 120 and the second gas inlet unit 150.

The first heat exchanger 110 is in a state in which freezing has occurred, and inlet gas flowing into the first heat exchanger 110 may have a temperature greater than a freezing temperature of the target gas. As the inlet gas is introduced into the first heat exchanger 110, the first heat exchanger 110 may be thawed. At this time, in the first heat exchanger 110, condensation of the target gas also occurs, so that the target gas may be primarily removed from the inlet gas.

A refrigerant may be supplied to the first heat exchanger 110, and target gas among gases flowing into the first heat exchanger 110 is condensed through the refrigerant. Here, in the first heat exchanger 110, freezing does not occur, and only condensation of the target gas may occur. That is, the target gas may be condensed from the inlet gas while the first heat exchanger 110 is thawed by adjusting the temperature or flow rate of refrigerant supplied to the first heat exchanger 110.

Because a temperature at which the target gas is condensed is greater than a freezing temperature, thawing may occur in the first heat exchanger 110. In particular, the first heat exchanger 110 is thawed while using the inlet gas flowing into the first heat exchanger 110 as a sweep gas, and at the same time, the target gas may be condensed from the inlet gas.

Gas from which the target gas is primarily removed in the first heat exchanger 110 is transferred to the second heat exchanger 140 by moving along the first connection pipe 130. When gas from which gas is primarily removed is transferred from the first heat exchanger 110 by moving along the first connection pipe 130, the first connection valve 131 may be opened, and the first gas discharge valve 192 may be closed.

According to an embodiment, when the target gas is moisture, moisture frozen in the first heat exchanger 110 may be thawed by inlet gas flowing into the first heat exchanger 110, and the moisture may be primarily removed while being condensed from the inlet gas flowing into the first heat exchanger 110.

The moisture thawed in the first heat exchanger 110 and the moisture condensed in the first heat exchanger 110 may be discharged through the first liquid discharge pipe 181, and at this time, the first liquid discharge valve 182 may be opened. Gas from which the moisture is primarily removed in the first heat exchanger 110 is transferred to the second heat exchanger 140 by moving along the first connection pipe 130.

Here, the temperature of gas discharged from the first heat exchanger 110, from which moisture is primarily removed, may be greater than 0 degrees by adjusting refrigerant supplied to the first heat exchanger 110. Because moisture must be condensed in the first heat exchanger 110 while thawing occurs, the temperature of gas discharged from the first heat exchanger 110, from which moisture is primarily removed, must be greater than 0 degrees.

Also, the temperature or flow rate of the refrigerant supplied to the first heat exchanger 110 may be adjusted so that the temperature of gas discharged from the first heat exchanger 110 through the first connection pipe 130 is less than the temperature of inlet gas.

When the temperature of gas discharged from the first heat exchanger 110 through the first connection pipe 130 is greater than the temperature of the inlet gas, the target gas included in the inlet gas may be discharged without being condensed. Also, while the target gas thawed in the first heat exchanger 110 is vaporized, the concentration of the target gas among gases discharged from the first heat exchanger 110 through the first connection pipe 130 may be greater than the concentration of the target gas among the inlet gas.

Accordingly, the temperature or flow rate of refrigerant supplied to the first heat exchanger 110 is preferably adjusted so that the temperature of gas discharged from the first heat exchanger 110 through the first connection pipe 130 is less than the temperature of inlet gas.

Second freezing operation S142 is an operation of transferring inlet gas flowing into the first heat exchanger 110 to the second heat exchanger 140 through the first connection pipe 130 to freeze the target gas in the second heat exchanger 140.

In the second heat exchanger 140, the target gas may be removed once more through freezing. Gas from which the target gas is removed once more through freezing in the second heat exchanger 140 may be discharged through the second gas discharge pipe 193. At this time, the second gas discharge valve 194 is open.

In particular, moisture may be removed once more by freezing the moisture in the second heat exchanger 140, and gas from which moisture is removed may be discharged through the second gas discharge pipe 193. At this time, the second gas discharge valve 194 is open.

The second gas discharge pipe 193 is connected to the gas discharge pipe 195 discharging gas to the outside, and gas containing carbon dioxide while from which moisture is removed may be discharged through the gas discharge pipe 195.

A refrigerant may be supplied to the second heat exchanger 140, and the target gas among gases flowing into the second heat exchanger 140 may be frozen. According to an embodiment, when the target gas is moisture, moisture is frozen in the second heat exchanger 140 by adjusting refrigerant supplied to the second heat exchanger 140. At this time, the temperature of gas discharged from the second heat exchanger 140, from which moisture is removed, may be lower than 0 degrees, which is a temperature at which moisture may be frozen.

In second process operation S140, second thawing operation S141 may occur in the first heat exchanger 110, and second freezing operation S142 may occur in the second heat exchanger 140.

According to an embodiment, second thawing operation S141 and second freezing operation S141 of second process operation S140 may be simultaneously performed. That is, thawing may occur in the first heat exchanger 110, and freezing may occur in the second heat exchanger 140.

According to an embodiment, after first process operation S130 is performed for a designated time, second process operation S140 may be performed for another designated time. Also, first process operation S130 may be performed again after second process operation S140 is performed, and first process operation S130 and second process operation S140 may be alternately performed.

Here, time for performing first process operation S130 and time for performing second process operation S140 may or may not be the same. According to an embodiment, the time for performing first process operation S130 and second process operation S140 may vary depending on a heat exchange area of the first heat exchanger 110 and a heat exchange area of the second heat exchanger 140.

As such, when first process operation S130 and second process operation S140 are alternately performed, target gas is repeatedly frozen and thawed in the first heat exchanger 110 and the second heat exchanger 140.

In particular, in first process operation S130, thawing of target gas occurs in the second heat exchanger 140, and freezing of target gas occurs in the first heat exchanger 110. In second process operation S140, thawing of target gas occurs in the first heat exchanger 110, and freezing of target gas occurs in the second heat exchanger 140.

In the target gas separation method using a deep cooling process according to an embodiment, as freezing and thawing of target gas repeatedly occur in the first heat exchanger 110 and the second heat exchanger 140 by alternately performing first process operation S120 and second process operation S130, separate hot water for thawing may not be used in the first heat exchanger 110 and the second heat exchanger 140.

In particular, in the target gas separation method using a deep cooling process according to an embodiment, as frozen target gas is thawed by using process gas present in the cooling process as sweep gas, it is not necessary to use separate hot water in the first heat exchanger 110 and the second heat exchanger 140, and the target gas may be efficiently separated.

However, the disclosure is not limited thereto, and before inlet gas is introduced into the first heat exchanger 110 or the second heat exchanger 140 through the first gas inlet unit 120 or the second gas inlet unit 150, the inlet gas may also be heated by using a heat exchanger to increase a thawing effect.

Accordingly, in the target gas separation method using a deep cooling process according to an embodiment, moisture may be removed from inlet gas to several tens of ppm or less, and loss or contamination of refrigerant may be prevented.

Referring to FIG. 3, the first connection pipe 130 and the second connection pipe 160 of the gas separation device may be connected to the connection compressor 171. At this time, the first connection pipe 130 and the second connection pipe 160 may be connected to one connection compressor 171.

The first connection pipe 130 and the second connection pipe 160 may share one connection compressor 171, and the first connection pipe 130 and the second connection pipe 160 may be connected to each other through one connection compressor 171.

Referring to FIG. 3, in first process operation S130, when transferring gas from which target gas is primarily removed to the first heat exchanger 110 through the second connection pipe 160, the connection compressor 171 may be used.

The connection compressor 171 may compress gas, and in first process operation S130, gas from which moisture is primarily removed may be transferred to the first heat exchanger 110 through the connection compressor 171. At this time, the second compressor connection valve 162 may be opened, and the first compressor connection valve 132 may be closed.

Referring to FIG. 3, in second process operation S140, when transferring gas from which target gas is primarily removed to the second heat exchanger 140 through the first connection pipe 130, the connection compressor 171 may also be used.

The connection compressor 171 may compress gas, and in second process operation S140, gas from which moisture is primarily removed may be transferred to the second heat exchanger 140 through the connection compressor 171. At this time, the first compressor connection valve 132 may be opened, and the second compressor connection valve 162 may be closed.

Referring to FIG. 4, the gas separation device further includes the first branch pipe 133 branched from the first connection pipe 130 and connected to the second heat exchanger 140, and the second branch pipe 163 branched from the second connection pipe 160 and connected to the first heat exchanger 110.

The first branch pipe 133 may include a first branch pipe valve 134 that opens and closes the first branch pipe 133, and the second branch pipe 163 may include a second branch pipe valve 164 that opens and closes the second branch pipe 163.

In first process operation S130, gas discharged from the second heat exchanger 140 is re-introduced into the second heat exchanger 140 through the first branch pipe 133.

In particular, the gas discharged from the second heat exchanger 140 in first process operation S130 may flow into the connection compressor 171 through the second connection pipe 160. At this time, the second compressor connection valve 162 is open, and the first compressor connection valve 132 is closed.

The connection compressor 171 is connected to the first connection pipe 130 and the second connection pipe 160, and gas flowing into the connection compressor 171 may move along the second connection pipe 160 and the first connection pipe 130.

Referring to FIG. 4, gas moving through the second connection pipe 160 flows into the first heat exchanger 110. At this time, the second branch pipe valve 164 is closed, and the second connection valve 161 is open. Gas moving along the first connection pipe 130 may reflow into the second heat exchanger 140 by moving along the first branch pipe 133. At this time, the first branch pipe valve 134 is open, and the first connection valve 131 is closed.

As such, gas discharged from the second heat exchanger 140 may reflow into the second heat exchanger 140 through the second connection pipe 160—the connection compressor 171—the first connection pipe 130—the first branch pipe 133.

When the gas discharged from the second heat exchanger 140 in first process operation S130 is re-introduced into the second heat exchanger 140 through the first branch pipe 133, the second heat exchanger 140 may also be thawed through the re-introduced gas.

Because the temperature of the gas re-introduced into the second heat exchanger 140 through the first branch pipe 133 has been increased by the connection compressor 171, the gas may be used again as gas thawing the second heat exchanger 140.

In second process operation S140, gas discharged from the first heat exchanger 110 may be re-introduced into the first heat exchanger 110 through the second branch pipe 163.

In particular, the gas discharged from the first heat exchanger 110 in second process operation S140 may flow into the connection compressor 171 through the first connection pipe 130. At this time, the first compressor connection valve 132 is open, and the second compressor connection valve 162 is closed.

The connection compressor 171 is connected to the first connection pipe 130 and the second connection pipe 160, and gas flowing into the connection compressor 171 may move along the second connection pipe 160 and the first connection pipe 130.

Referring to FIG. 4, gas moving through the first connection pipe 130 flows into the second heat exchanger 140. At this time, the first branch pipe valve 134 is closed, and the first connection valve 131 is open. Gas moving along the second connection pipe 160 may reflow into the first heat exchanger 110 by moving along the second branch pipe 163. At this time, the second branch pipe valve 164 is open, and the second connection valve 161 is closed.

As such, gas discharged from the first heat exchanger 110 may reflow into the first heat exchanger 110 through the first connection pipe 130—the connection compressor 171—the second connection pipe 160—the second branch pipe 163.

When the gas discharged from the first heat exchanger 110 in second process operation S140 is re-introduced into to the first heat exchanger 110 through the second branch pipe 163, the first heat exchanger 110 may also be thawed through the re-introduced gas.

Because the temperature of the gas re-introduced into the first heat exchanger 110 through the second branch pipe 163 has been increased by the connection compressor 171, the gas may be used again as gas thawing the first heat exchanger 110.

The target gas separation method using a deep cooling process according to the embodiment described above has the following effects.

In the target gas separation method using a deep cooling process according to the embodiment, moisture may be separated from natural gas, flue gas, and synthetic gas while repeatedly freezing and thawing a heat exchanger in the deep cooling process.

Also, in the target gas separation method using a deep cooling process according to the embodiment, as moisture is removed while repeatedly freezing and thawing the heat exchanger in the deep cooling process, moisture may be removed from inlet gas to several tens of ppm or less.

In addition, in the target gas separation method using a deep cooling process according to the embodiment, as frozen moisture gas is thawed by using process gas preset in the cooling process as sweep gas, it is not necessary to use separate hot water, and moisture gas may be effectively separated.

Also, in the target gas separation method using a deep cooling process according to the embodiment, as moisture is removed while repeatedly freezing and thawing the heat exchanger in the deep cooling process, loss or contamination of refrigerant may be prevented, and a space temperature of a space in which moisture is frozen inside the heat exchanger does not easily rise, and thus a problem that a lot of time is required for thawing may be solved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A target gas separation method through a gas separation device configured to separate gas by using a deep cooling process, wherein the gas separation device comprises:
a first heat exchanger configured to cool inlet gas; a first gas inlet unit connected to the first heat exchanger and configured to introduce the inlet gas into the first heat exchanger; a second heat exchanger configured to cool inlet gas; a second gas inlet unit connected to the second heat exchanger and configured to introduce the inlet gas to the second heat exchanger; a first connection pipe configured to transfer gas from the first heat exchanger to the second heat exchanger; and a second connection pipe configured to transfer gas from the second heat exchanger to the first heat exchanger, the method comprising: a first process operation comprising a first thawing operation of blocking the first gas inlet unit and introducing inlet gas to the second heat exchanger through the second gas inlet unit to thaw the second heat exchanger and a first freezing operation transferring gas flowing into the second heat exchanger to the first heat exchanger through the second connection pipe to freeze target gas in the first heat exchanger; and a second process operation comprising a second thawing operation of blocking the second gas inlet unit and introducing inlet gas to the first heat exchanger through the first gas inlet unit to thaw the first heat exchanger and a second freezing operation of transferring gas flowing into the first heat exchanger to the second heat exchanger through the first connection pipe to freeze the target gas in the second heat exchanger, and wherein, after the first process operation is performed for a designated time, the second process operation is performed for another designated time.

2. The target gas separation method of claim 1, wherein the first process operation and the second process operation are alternately performed.

3. The target gas separation method of claim 1, wherein the target gas comprises moisture.

4. The target gas separation method of claim 1, wherein the first gas inlet unit and the second gas inlet unit are connected to a compressor.

5. The target gas separation method of claim 1, wherein the first gas inlet unit comprises a first opening/closing valve configured to open and close the first gas inlet unit, and the second gas inlet unit comprises a second opening/closing valve configured to open and close the second gas inlet unit.

6. The target gas separation method of claim 1, wherein the first connection pipe comprises a first connection valve configured to open and close the first connection pipe, and the second connection pipe comprises a second connection valve configured to open and close the second connection pipe.

7. The target gas separation method of claim 1, wherein the first connection pipe and the second connection pipe are connected to a connection compressor.

8. The target gas separation method of claim 7, wherein the first connection pipe comprises a first compressor connection valve configured to open and close the first connection pipe at a front end of the connection compressor, and the second connection pipe comprises a second compressor connection valve configured to open and close the second connection pipe at the front end of the connection compressor.

9. The target gas separation method of claim 1, wherein the gas separation device further comprises a first branch pipe connected to the second heat exchanger and branched from the first connection pipe, and a second branch pipe connected to the first heat exchanger and branched from the second connection pipe, and wherein the first branch pipe comprises a first branch pipe valve configured to open and close the first branch pipe, and the second branch pipe comprises a second branch pipe valve configured to open and close the second branch pipe.

* * * * *